United States Patent [19]
Akers et al.

[11] Patent Number: 5,213,636
[45] Date of Patent: May 25, 1993

[54] METHOD AND APPARATUS OF QUENCH HARDENING OF GEAR TEETH SURFACES

[75] Inventors: Ronald R. Akers, Bloomfield Hills; William D. West, Clarkston, both of Mich.

[73] Assignee: Tocco, Inc., Boax, Ala.

[21] Appl. No.: 715,990

[22] Filed: Jun. 17, 1991

[51] Int. Cl.$^5$ .............................................. H05B 6/14
[52] U.S. Cl. .................................... 148/573; 148/574; 148/586; 148/588; 148/903; 266/125; 266/126; 266/249; 219/10.43; 219/10.59
[58] Field of Search ............... 148/147, 150, 153, 143, 148/586, 588, 573, 574, 903; 266/125, 129, 83, 249, 126; 219/10.43, 10.59, 10.75, 61.7, 62

[56] References Cited

U.S. PATENT DOCUMENTS

| 4,675,488 | 6/1987 | Mucha et al. | 219/10.43 |
| 4,757,170 | 7/1988 | Mucha et al. | 148/147 |
| 4,894,501 | 6/1990 | Pfaffman et al. | 219/10.43 |

FOREIGN PATENT DOCUMENTS

864048  3/1961  United Kingdom ............... 148/147

Primary Examiner—R. Dean
Assistant Examiner—Sikyin Ip
Attorney, Agent, or Firm—Body, Vickers & Daniels

[57] ABSTRACT

A method for induction heating and quench hardening of helical gears provides a hardness pattern uniformly distributed to a controlled depth across and between the teeth surfaces by means of axial scanning of the workpiece and uniform quenching. Uniform quenching is achieved by directing jets of quench fluid at the workpiece toothed surface at angles horizontally offset from the radial direction.

14 Claims, 6 Drawing Sheets

GEAR HELIX ANGLE = 20°

| SUBARRAY NUMBER | VERTICAL OFFSET ANGLE (DEGREES) | HORIZONTAL OFFSET ANGLE (DEGREES) (Z) |
|---|---|---|
| 1 | 28 | 6.2 |
| 2 | 31 | 6.9 |
| 3 | 33 | 7.3 |
| 4 | 34.5 | 7.7 |
| 5 | 36 | 8.0 |
| 6 | 37 | 8.2 |

$$\text{HORIZONTAL OFFSET ANGLE} = \frac{\text{VERTICAL OFFSET ANGLE}}{90°} \times \text{GEAR HELIX ANGLE}$$

FIG. 10

METHOD AND APPARATUS OF QUENCH HARDENING OF GEAR TEETH SURFACES

INCORPORATION BY REFERENCE

Applicant hereby incorporated U.S. Pat. No. 4,894,501 issued Jan. 16, 1990, entitled "Method and Apparatus for Induction Heating of Gear Teeth" to Pfaffmann et al., U.S. Pat. No. 4,675,488 issued Jun. 23, 1987, entitled "Method of Heat Treating Using Eddy Current Temperature Determination" to Pfaffmann et al. and U.S. Pat. No. 4,757,170 issued Jul. 21, 1988, entitled "Method and Apparatus for Inducting Heating Gears and Similar Workpieces" to Mucha et al. herein as is fully set forth.

BACKGROUND OF THE INVENTION

This invention is particularly applicable to inductively heating and quench hardening the cylindrical toothed surface of an axially elongated, helically toothed gear and will be described with particular reference thereto. However, the invention has broader applications and may be used for quench hardening other elongated workpieces with significantly textured cylindrical surfaces generally concentric with a central axis.

It is desirable to harden the toothed surface of a gear to enable that surface to withstand the wear and contact forces exerted during operation of a high power transmitting gear train. The surfaces to be hardened are those which intermesh with other gears including the connecting surfaces between the gear teeth as well as the flanks and tips of the gear teeth themselves. It is desirable to keep the body of the gear and gear teeth beneath the hardened surface relatively soft to provide strength and ductility to the gear structure. Ideally, the hardened gear has a hardness pattern extending to a uniform and shallow depth across the entire hardened surface to provide the resistance to surface abrasion associated with hardening while at the same time preserving the strength of the underlying material by avoiding the brittleness associated with hardening in the body of the gear beneath the gear teeth surfaces.

Generally, to accomplish hardening, the material to be hardened must be raised above a transformation temperature and then quickly cooled by quenching to induce hardening. Factors affecting the resulting hardness pattern include the depth to which the material is heated, the degree to which the heated temperature exceeds the transformation temperature and the rate of cooling.

Previous methods of hardening the toothed surface of a gear have included the use of induction heating the gear teeth followed by a quenching step. A circular inductor coil closely spaced from the undulating gear teeth surface generally exposes the radially outermost regions of the gear teeth to a greater degree of induction heating then the connecting regions between the gear teeth, with the result that the temperature and depth of heating is correspondingly greater at the outer region of the gear teeth. The differently heated regions will then be cooled at differing rates in the liquid quenching process, with the result that the hardness pattern developed thereby will be uneven across the gear teeth, with excessive hardening to depth beneath the gear teeth surfaces and with insufficient hardening at the connecting surfaces between the gear teeth. Accordingly, in order to successfully harden gear teeth by induction heating and liquid quenching it is necessary to heat the gear teeth to a preselected temperature uniformly to a controlled depth and then immediately quench so that the surfaces of the geared teeth are uniformly and quickly cooled. Methods and apparatuses for providing the uniform heating to a preselected temperature uniformly to a controlled depth are described in U.S. Pat. No. 4,675,488; U.S. Pat. No. 4,757,170 and U.S. Pat. No. 4,894,501 assigned to the assignee of the present invention and incorporated herein by reference. While substantial success in uniform heating has been achieved, a problem still exists in the uniform quench hardening of helical gears.

The problem of nonuniform quenching is especially a problem in high production rate hardening of gears. Thus, elongated helical gears which must be surface hardened in great numbers are processed in hardening stations which quickly and automatically apply heat inductively to the gear followed by application of quenching fluid. One such method and apparatus is described in U.S. Pat. No. 4,894,501. In such a system, a gear is placed upon a support structure and lowered through a hardening apparatus. An upper element in the apparatus inductively heats a circular band in the gear adjacent the inductive heating element as the gear moves downwardly by the inductive heating element. A quench element is positioned directly below the inductive heating element. The quench element sprays a quench fluid at the gear, quenching and hardening the toothed surface. The entire gear is hardened as it passes downwardly past the inductive heating element and the quenching element. In the hardening of large numbers of gears, such a station is automated and repetitively performs the hardening cycle on gears which are successively loaded upon the support element. The gears are raised, lowered and hardened and removed from the support element. The gears are often spun during the hardening operation so that a uniform heating and quenching pattern around the periphery of the gear is achieved.

Applicant has found that in the above described apparatus and method, quench fluid flow over the tooth surface of the gear may not be uniform. Irregularities in the fluid flow result in irregularities in the cooling rate of the heated surface and irregularities of the hardness pattern of the finished gear. In hardening wheel gears with the teeth on the outside surface of the gear, the problem of nonuniform quench is emphasized because the spinning wheel gear flings quench fluid from its surfaces by its spinning action. Fluid is flung first from the grooves between the teeth, flows out the sides of the teeth and is ejected from the tip area. For helical gears, achievement of uniformity of flow of quench fluid to the entire toothed surface is particularly difficult. The teeth of a helical gear are inclined with respect to the axis of the gear and the flanks of the gear teeth present surfaces at difficult angles for quenching. The achievement of high production rate, induction heating and quench hardening is thus limited by the ability to achieve a uniform quench of complex gear shapes, particularly in the case of helical gear shapes.

SUMMARY OF THE INVENTION

The present invention overcomes the above described disadvantages and others and provides a method and apparatus for induction heating and quench hardening of an undulating generally cylindrical surface, such as the toothed surface of a helical gear.

In accordance with a principle feature of the invention there is provided a method for hardening the toothed surface of an axially elongated gear having a central axis, the toothed surface including gear teeth and connecting roots, wherein the method comprises the steps of heating the toothed surface to a quench hardening temperature to a selected shallow depth and directing a quenching fluid toward the toothed surface in a circular array of jets at an angle or range of angles offset from a radial direction in a plane perpendicular to the gear central axis.

Further in accordance with the invention, the jets of quenching fluid are vertically offset from a radial direction.

Yet further in accordance with the invention, the jets of quenching fluid are offset from a radial direction by about 30° from horizontal.

Still further in accordance with the invention, quenching fluid is provided through jets arrayed in a number of circles stacked one on top of the other, each of these jets being directed at the gear toothed surface at a horizontal angle offset from radial and at a vertical angle offset from radial arranged such that each jet is vertically aligned with at least one other jet, the top most jet of a vertically aligned set being more closely aligned with horizontal than the bottom most jet whereby quenching fluid impinges upon the surface to be quenched forcefully over a vertical zone with the jets optimally aimed for penetration to the root between gear teeth and the jet vertical angles selected to produce a uniform downward flow of quenching fluid along the toothed surface of the gear.

Still further in accordance with the invention, an apparatus is provided comprising a means heating the toothed surface of a gear to a quench hardening temperature and a quenching means is provided comprising a circular conduit receiving a quenching fluid. The circular conduit has a central axis and is positioned to allow the close positioning of the toothed surface of a gear to be hardened near the quenching conduit. The quenching conduit has a plurality of apertures adapted to eject jets of quenching fluid directed at the gear at an angle or range of angles horizontally offset from a radial direction.

Still further in accordance with the invention, an apparatus is provided in which the apertures in the conduit are adapted to eject the jets of quenching fluid at an angle or range of angles vertically offset from horizontal.

Still further in accordance with the invention, the conduit is provided with a number of circular arrays of apertures stacked one on top of the other in which the apertures of the topmost circular array is vertically offset from horizontal the least amount, the lowermost circular array of apertures is vertically offset from horizontal the greatest amount and intermediate circular arrays of apertures are vertically offset from horizontal a greater amount than the next upper circular array of apertures.

Yet further in accordance with the invention, the conduit is provided with a number of circular arrays of apertures stacked one on top of the other in which the apertures of the topmost circular array is vertically offset from horizontal the least amount, the lowermost circular array of apertures is vertically offset from horizontal the greatest amount and intermediate circular arrays of apertures are vertically offset from horizontal a greater amount than the next upper circular array of apertures; and, the apertures are horizontally offset from the radial direction in accordance with the formula "horizontal offset angle equals vertical offset angle divided by ninety times the gear helix angle."

The primary object of the present invention is to provide an improved method and apparatus for inductively heating and quench hardening an undulating cylindrical surface, such as that defined by the gear teeth of a helical gear to yield a hardness pattern extending to a controlled depth uniformly distributed across the undulating surface.

Another object of the present invention is to provide a method of uniformly quenching the toothed surface of a gear, particularly a helical gear, which has been heated to hardening temperature.

Still another object of the present invention is to provide an apparatus and method providing a uniform flow of quenching fluid to the roots, tips and flanks of a toothed gear surface and a helical gear.

Yet another object of the present invention is to provide an array of jets of quenching fluid producing a flow of quench fluid flowing downwardly and swirling in a direction parallel to the roots of a helical gear toothed surface to be quenched.

These and other objects and advantages of the invention will become apparent from the following description of the preferred embodiment thereof taken together with the accompanying drawings.

DESCRIPTION OF THE PREFERRED EMBODIMENT

Figure 1:
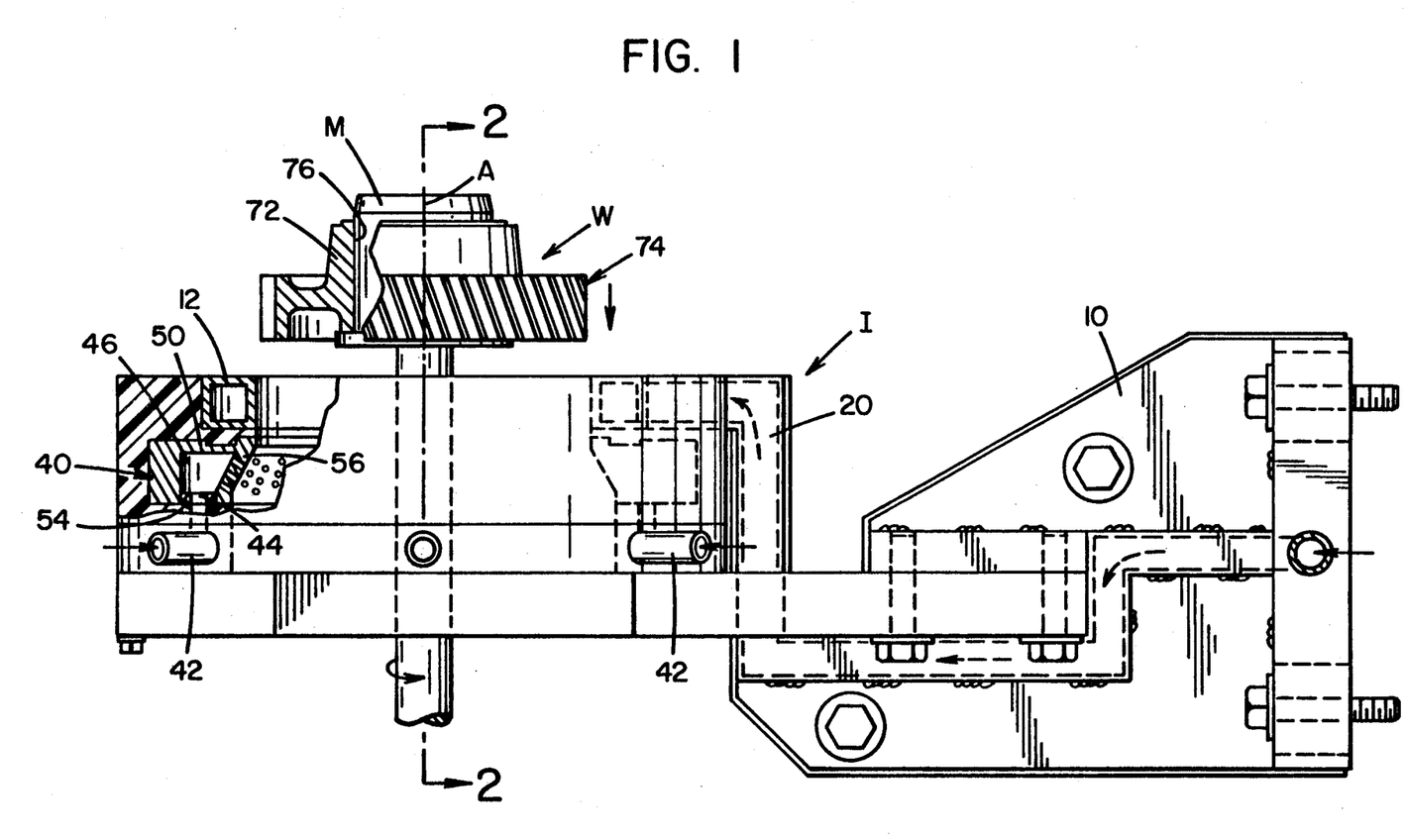
FIG. 1 is a side view, partially in section, illustrating the preferred embodiment of the present invention.
Figure 2:
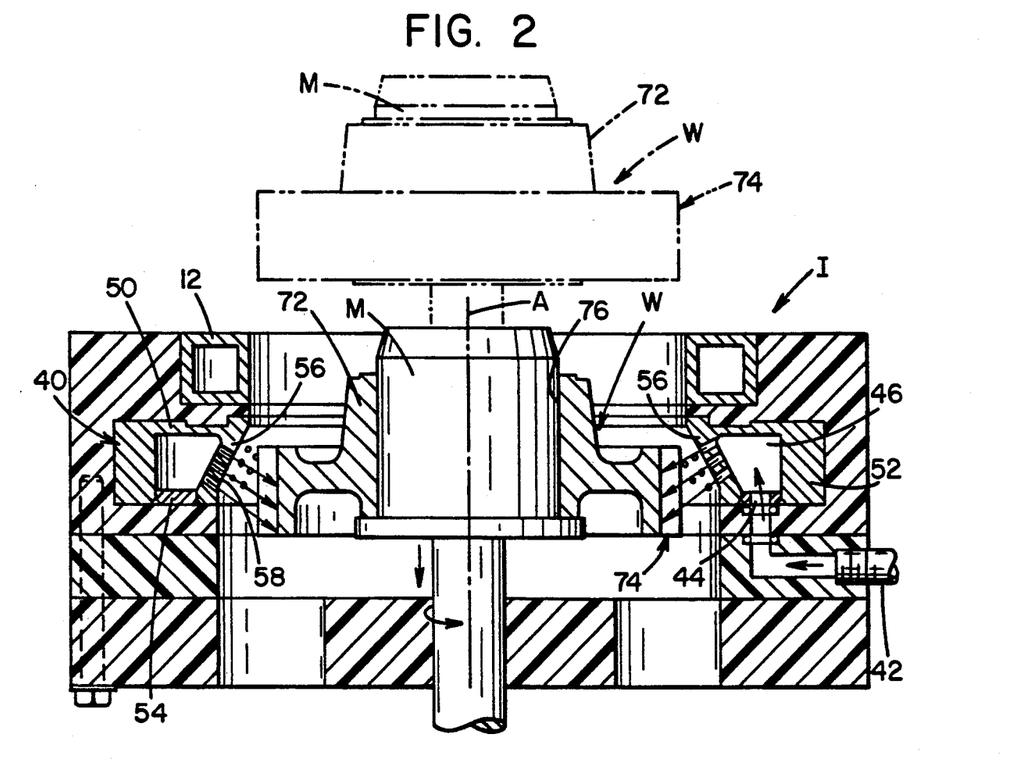
FIG. 2 is an enlarged frontal elevational view taken along line 2—2 of FIG. 1.

Referring now to the drawings wherein the showings are for the purpose of illustrating a preferred embodiment of the invention only and not for the purpose of limiting same, in FIG. 1, there is shown an apparatus for progressively inductively heating and quench hardening the outer cylindrical gear teeth surface of a workpiece W. The apparatus is generally comprised of an inductor and quench assembly I receiving electric current of audio and/or radio frequency from one or more power supplies, inductor cooling fluid from a cooling fluid supply and quench fluid from a quench fluid supply. Referring particularly to FIGS. 1 and 2, the inductor and quench assembly I comprises a support fixture 10, an inductor bus assembly 20 and a quench assembly 40. The inductor bus assembly 20 provides electrical current and cooling fluid to a single turn inductor coil 12 extending substantially in a circle about an axis A with a gap between the circumferentially opposite ends thereof. As more fully described in U.S. Pat. No. 4,894,501, which is incorporated herein by reference, the inductor coil 12 is cooled by cooling fluid and energized with electric current to inductively heat the workpiece W as it moves downwardly through the central aperture of the inductor coil 12 supported by the mandrel M. U.S. Pat. No. 4,894,501 describes an induction heating apparatus, the preferred embodiment of which is used to process ring gears having the toothed surface on an inwardly facing cylindrical surface. The preferred embodiment of the present invention is set up to process wheel gears having the toothed surface on the outer cylindrical surface of the workpiece. The inductive heating concepts used in these situations are identical. The position of the inductor coil and the workpiece are reversed, but the inductor coil operates in the same way.

As in U.S. Pat. No 4,894,501, processing occurs as the workpiece W is moved downwardly with respect to the inductor coil 12 and the quench assembly 40. A circular zone in the gear is first heated and then quenched. The quench assembly 40 comprises several quench fluid delivery tubes 42, quench fluid deliver conduits and a circular quench fluid duct 46. Quench fluid is delivered through multiple tubes to associated conduits which in turn deliver the fluid to the single, circular quench fluid duct 46. The quench fluid duct 46 is surrounded by a top wall 50, a cylindrical outer wall 52, a circular bottom wall, 54 through which the delivery conduits 44 pass, and a conical inner wall 56. The inner wall 56 is shown enlarged and in greater detail in FIG. 3. The inner conical face 58 of the inner wall 56 is inclined with respect to vertical at an angle of 28°. The top of the inner face 58 is closer to the central axis A, which is vertically aligned, than is the bottom of the inner face 58.

The inner wall 56 is provided with a plurality of apertures distributed around its entire surface. Three of these apertures are shown in cross section if FIG. 3. A top aperture 60 is a passage of circular cross section whose axis is offset from horizontal by 28°. It is one of thirty identically orientated apertures spaced every 12° around the top of the inner wall 56. An intermediate aperture 62 is disposed directly below the top aperture 60. The intermediate aperture 62 has a uniform circular cross section and its axis is offset from the horizontal by 33 degrees. A lower aperture 64 is disposed directly below the intermediate aperture 62. The lower aperture 64 also has a circular cross section and its axis is disposed at an angle of 36° from the horizontal.

Figure 3:
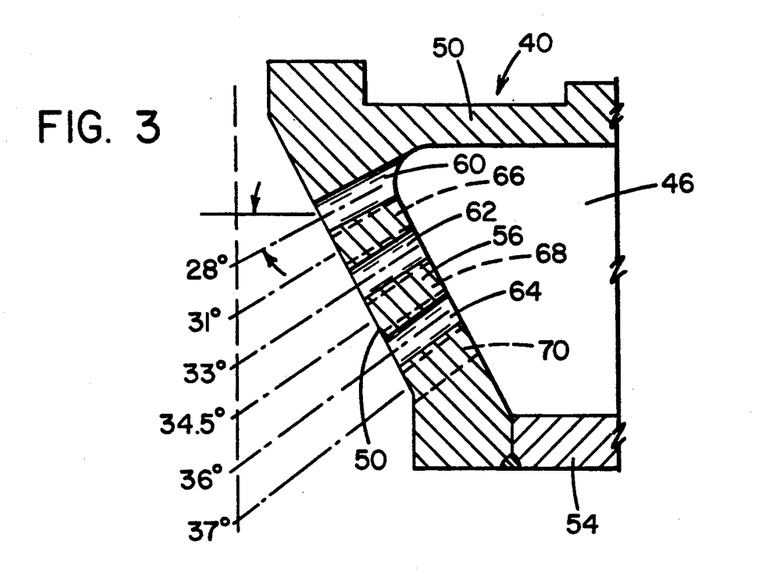
FIG. 3 is a further enlarged sectional view of the quenching fluid conduit and quenching fluid apertures also seen in FIG. 2.
Figure 4:
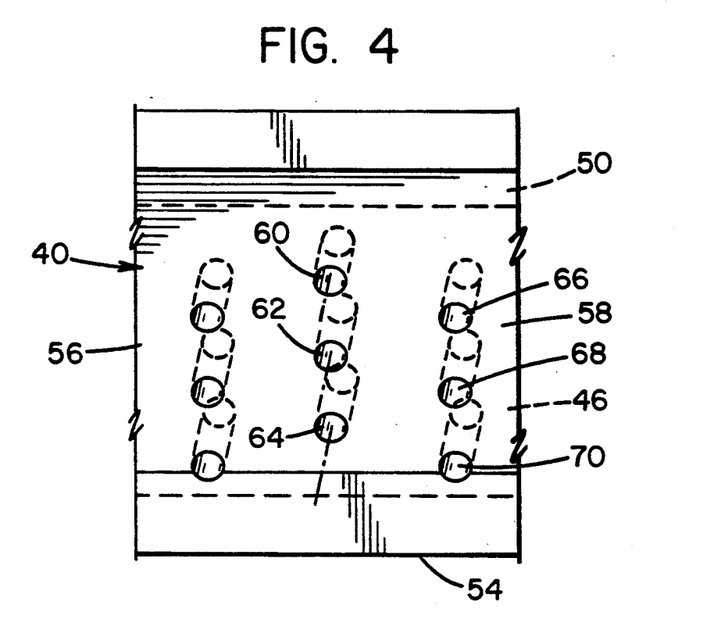
FIG. 4 is a frontal view of the side wall of the quenching fluid conduit seen in FIG. 3 showing the alignment of the quench fluid apertures.

FIG. 4 shows a frontal view of an enlarged segment of the conical inner wall 56. Apertures 60, 62 and 64 are illustrated in the center of this segment. Disposed beside aperture 60, 62 and 64 are three additional apertures. An upper intermediate aperture 66 is vertically disposed less near the top of the inner wall 56 than the top aperture 60 but nearer the top than the intermediate aperture 62. As seen in FIG. 3, its axis is at an angle of 31° from horizontal. A lower intermediate aperture 68 is disposed directly below the upper intermediate aperture 66 and is vertically disposed between the intermediate aperture 62 and the lower aperture 64. The axis of the lower intermediate aperture 68 forms an angle of 34.5° with the horizontal. A bottom aperture 70 is disposed directly below the lower intermediate aperture 68 near the bottom of the inner wall 56. The axis of the bottom aperture 70 is at an angle of 37° from horizontal.

As can be seen in FIGS. 1 and 4, the vertically aligned sets of apertures 60, 61, 62 in a first set and 66, 68 and 70 in a second set repeat alternately around the entire periphery of the inner wall 56. A vertically aligned set of three apertures occurs every 6° around the entire periphery resulting in 180 apertures. Each aperture is 5/64 inches (0.078125 inches or 0.1984375 centimeters) in diameter.

Figure 6:
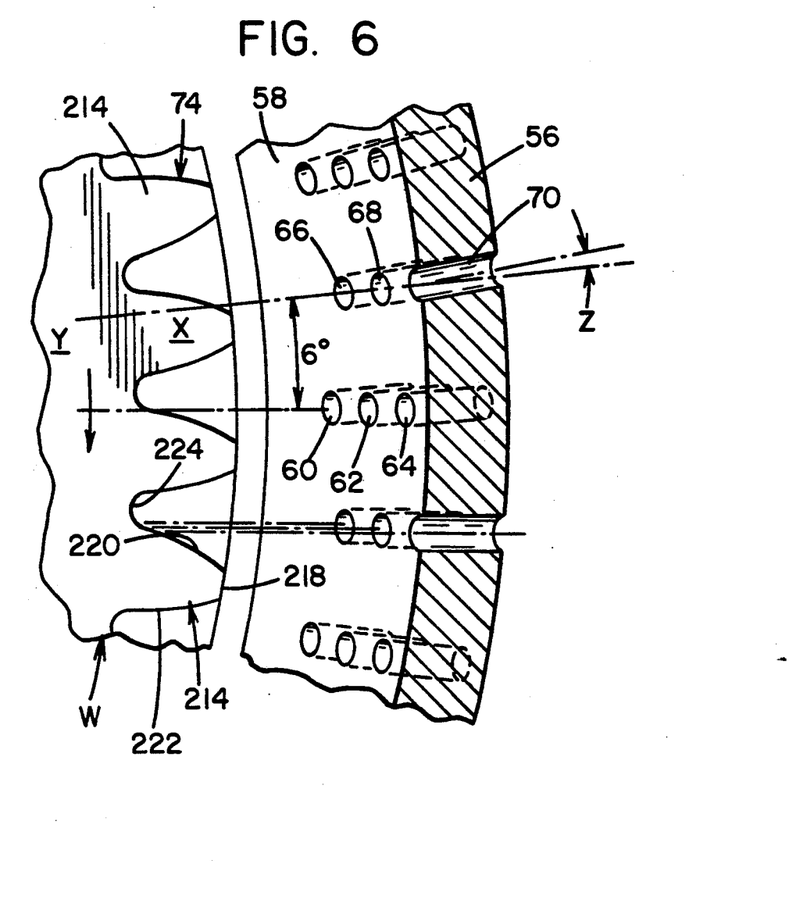
FIG. 6 is a bottom plan, partially in section, of the quench apertures and the surface of a gear tooth showing the interrelationship of the horizontal quench aperture offset angle and the gear teeth.

As best seen in FIG. 6, the axis of the apertures 60, 62, 64, 66, 68 and 70 are offset in the horizontal plane as well as in the vertical plane. Rather than being directly radially inwardly aligned toward the axis A, the axis of each aperture forms a horizontal offset angle Z with the radial in the horizontal plane. The angle is selected to provide a swirling effect in the jets of quench fluid to match the contours of the workpiece. In the case of a helical gear, the horizontal offset angle Z for each aperture is selected so that the flow of quench fluid is inward and downward and parallel to the helical root valley. In a helical gear the root valleys and the tops of the teeth wind around the axis of the gear at a selected helix angle. Applicants have found an optimum horizontal offset angle is obtained by dividing the vertical offset angle by 90° and multiplying by the workpiece gear helix angle. Selection of the horizontal offset angles Z is described below for a gear with a helix angle of 20°.

Quench fluid from the quench fluid duct 46 is forced through all of the 180 apertures in the inner wall 56 and exit the inner face 58 as 180 jets of fluid. All of the jets are generally directed radially inwardly but are offset from an accurate radially inwardly direction by the horizontal offset angles Z. All of the 180 jets are generally downwardly directed at an angle of approximately 30° below horizontal. The 30 topmost jets including the jet from aperture 60 forms a subarray spaced evenly around the entire periphery of the quench fluid duct 46 in which all jets are directed downwardly at an angle of 28° below horizontal. As this apparatus is designed to quench helical gears with a helix angle of 20°, the horizontal offset angle Z is 28 divided by 90 times 20 which is 6.2°. The next subarray of jets including the jet from aperture 66 is directed downwardly at an angle of 31° below horizontal. The horizontal offset angle Z for this subarray is 6.9°. A third subarray of thirty jets, including the jet from aperture 62, is directed downwardly at an angle of 33° below horizontal. The horizontal offset angle Z for the third subarray is 7.3°. A fourth subarray, including the jet from aperture 68, is directed downwardly at an angle of 34.5°. The horizontal offset angle Z for the fourth subarray is 7.7°. A fifth subarray of thirty jets, including the jet from aperture 64, is directed downwardly at an angle of 36° below horizontal. The horizontal offset angle Z for the fifth subarray is 8.0°. A sixth, bottommost, subarray of jets including the jet from aperture 70 is directed downwardly at an angle of 37° below horizontal. The horizontal offset angle Z for the sixth subarray is 8.2°. These jets are illustrated schematically as arrows in FIG. 2 and the point of impact of these jets upon a helical gear workpiece W is illustrated schematically in FIGS. 5 and 7.

In some applications the horizontal offset angle Z will be selected as a single value for all arrays and good results still achieved. In the above described example, an angle Z of 7° can be selected and a maximum error of only 1.2° created.

OPERATION

The apparatus is particularly adapted for inductively heating and quench hardening the toothed surface of a helical wheel gear and operation of the preferred embodiment of the invention will be described with reference to such a workpiece. The operation of the power supply and the inductor portion of the apparatus is more fully described in U.S Pat. No. 4,894,501.

The workpiece W is generally cylindrical and includes a hub 72, a toothed surface 74 and a central aperture 76. During all of the operations described below, the workpiece W is supported on the mandrel M with a portion of the mandrel passing through the workpiece central aperture 76. The central axis of the mandrel and the central axis of the workpiece W are coincident with axis A.

Figure 5:
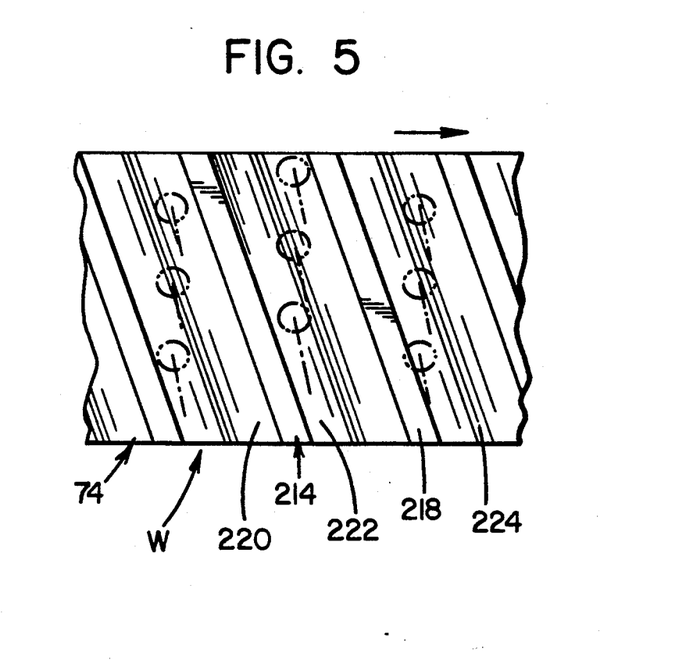
FIG. 5 is a projection of the jets created by the apertures seen in FIG. 4 to the point of impact upon the toothed surface of a gear being quenched.
Figure 7:
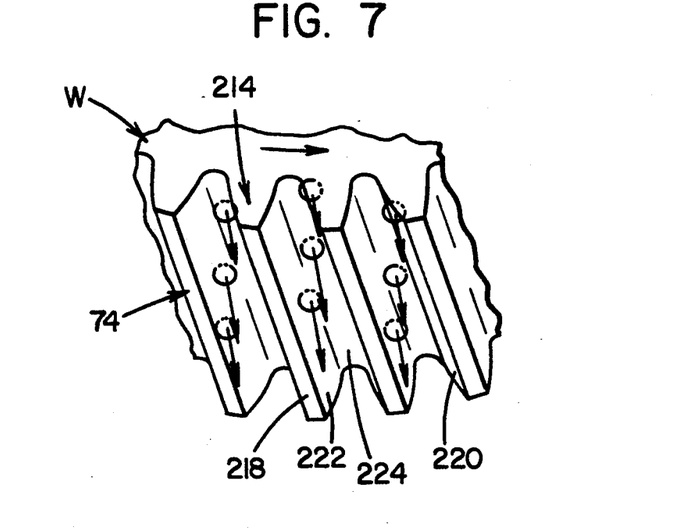
FIG. 7 is a pictorial view of the relationship between the impact points of the jets created by the quench apertures and helical gear teeth in a rotating helical gear being quenched.
Figure 8:
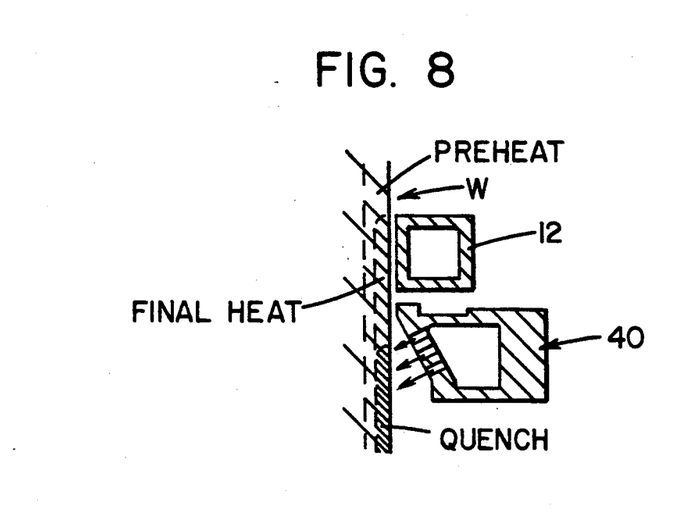
FIG. 8 is an enlarged cross sectional view showing the quench pattern and heating pattern being created by the preferred embodiment.

As seen in FIGS. 5, 6 and 7, the toothed surface 74 of the workpiece W comprises a plurality of gear teeth 214 having tops 218 and oppositely facing bearing surfaces 220 and 222. The individual teeth are joined by connecting root surfaces 224. Internal regions in the workpiece W are designated generally as the tooth thickness area X and the root area Y.

Operation of the method and apparatus begins with the placement of the workpiece W on the mandrel M as shown in FIG. 1. Preheating of the workpiece, if desired, is carried out in accordance with U.S. Pat. No. 4,894,501.

Final heating of the gear toothed surface proceeds with the workpiece W progressively moved downwardly past the inductor coil 12 at a controlled velocity. Current in the inductor coil 12 induce heating in a band on the workpiece adjacent the inductor coil 12. The workpiece W is spun on the mandrel M during this operation. Simultaneously, quenching fluid is directed through the quench fluid delivery tubes 42, the quench fluid delivery conduits 44, the quench fluid duct 46 and out of the aperture 60, 62, 64, 66, 68 and 70. The quench fluid forms jets directed by the apertures in a generally inward and downward direction toward the toothed surface 74 of the workpiece W. Quenching of the workpiece W occurs in a band disposed below the band in which induction heating occurred. Thus, as the workpiece W is lowered through the apparatus, it is inductively heated and quenched in successive bands until the operation is finished for the entire workpiece as the workpiece W exits the lower end of the apparatus.

Figure 10:
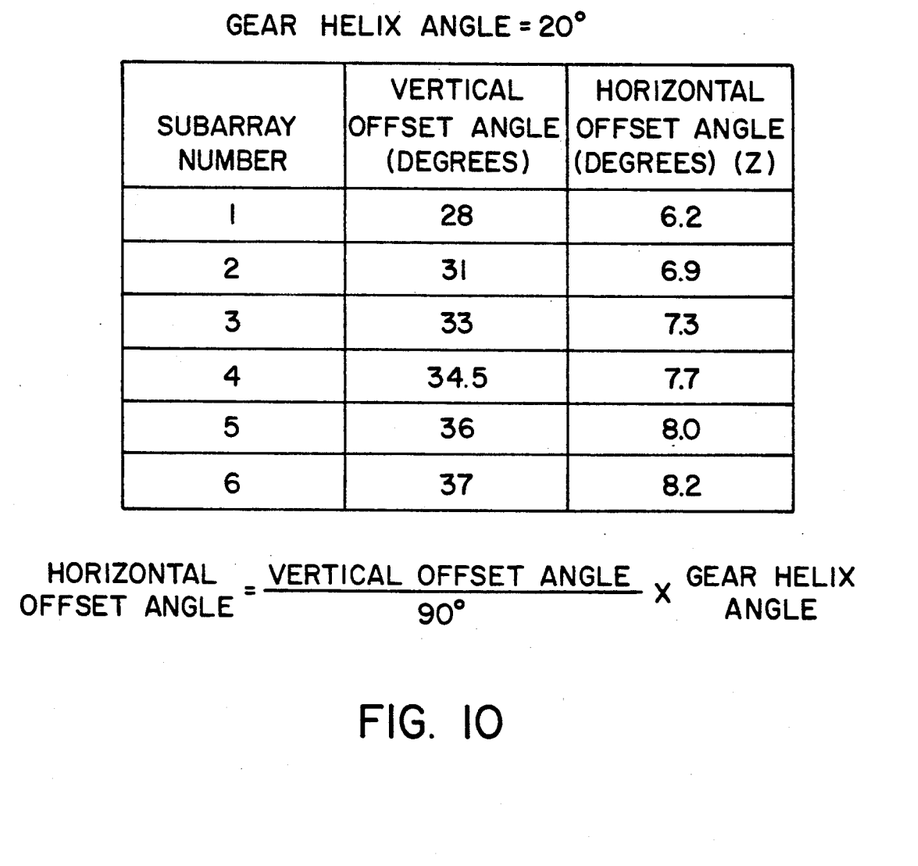

As seen in FIG. 7, in the case of a helical gear, the inpingement of three vertically aligned jets of fluid on the gear teeth is irregular. Moreover, the presentation of the recess between geared teeth is not apparently symmetrical with respect to a simple radially inwardly looking line as is the case with a nonhelical spur gear. Applicant has found that this results inconsistencies of quench fluid flow and therefore inconsistencies of quenching and hardness pattern when hardening helical gears. With the present invention, jets of quench fluid are directed toward the toothed surface at an angle horizontally offset from the radial inward direction by an angle Z equal to the vertical offset angle divided by 90 times the gear helix angle, as best seen in FIG. 6 and set forth in tabular form in FIG. 10. These jets are grouped such that three jets are vertically aligned every 6° around the periphery of the gear. The jets are also displaced from the direct radial direction in the vertical plane by a varying amount as best seen in FIG. 3. The jets, because of these offset angles, impinge upon both the gear tooth bearing surfaces 220, 222 at an angle more closely related to parallel than would otherwise be the case. This results in a scrubbing action which reduces the tendency to generate steam or vapor pockets which would otherwise be entrapped on the toothed surface interfering with heat transfer and rapid quenching. Additionally, the increasing vertical angle from the top jet to the bottom jet results in an improved downward flow of quench fluid along the tops 218, bearing surfaces 220, 222 and connecting root surfaces 224 of the gear teeth. Vertical scrubbing as well as radial scrubbing occurs and quench uniformity is improved.

In addition to the scrubbing provided by the offset angles described above, penetration of the quench fluid through the body of exhausted quench fluid being flung off by the gear is improved. Because the workpiece W is being spun during the heating and quenching operation, the quench fluid which had previously impinged upon the gear is ejected by first running radially outwardly along the tooth bearing surfaces 220, 222 and second, separating from the gear at the top 218. The spinning motion of the gear imparts a radial outward velocity upon the exhausted quench fluid. The offset jets achieve greater penetration to the connecting root surfaces 224 whereby a more even flow of quench fluid is provided to these critical areas.

Figure 9:
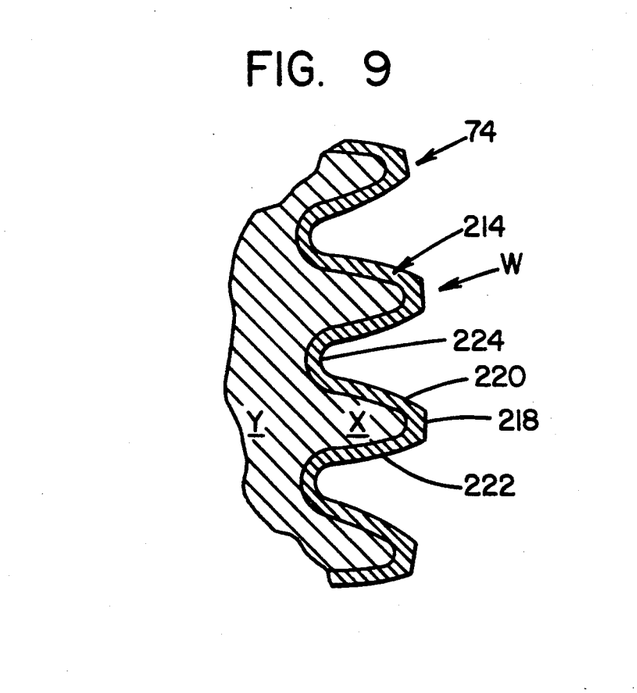
FIG. 9 shows the finished, hardened gear tooth pattern achieved by the preferred embodiment of the invention; and, FIG. 10 shows the calculation of horizontal offset angle tabularly.

More uniform quenching prevents unwanted stress development at the root of the gear teeth and provides for obtaining the ideal hardness pattern seen in FIG. 9. This pattern is optimally achieved by preheating followed by final heating to a uniform specified depth below the surface, as described in U.S. Pat. No. 4,894,501, and uniform quenching of the heated surface so that the uniform cooling and hardening is achieved. Stress at the gear teeth is avoided and a more uniform hardness achieved over the full profile of the tooth and root. This hardness pattern is achieved over the full axial length of the gear through the progressive heating and cooling in the heating and cooling bands described above. Scanning the part past the inductive coil and the quenching zone is achieved automatically and with high production rates.

While the preferred embodiment of the invention uses a horizontal offset angle varying inversely with the vertical offset angle, one can use a fixed horizontal offset angle for all vertical offset angles selected between 25° and 45° based on the gear helix angle only by dividing the helix angle by about 2.8. Thus, a gear having a helix angle of 22.5° would be quenched in an apparatus in which the horizontal offset angle of the jets formed by the apertures 60, 62, 64, 66, 68 and 70 would be offset from the radial by 8°.

The invention has been described with reference to the preferred embodiment. Obviously, modifications and alterations will occur to others upon the reading and understanding of this specification. It is intended to include all such modifications insofar as they come within the scope of the appended claims or the equivalents thereof.

Having thus described the invention, it is claimed:

1. An apparatus for inductively heating and quench hardening gear teeth surfaces of an axially elongated helical gear having a central axis and a helix angle, said gear teeth surfaces comprising radially projecting gear teeth and roots between adjacent teeth, said apparatus comprising:
   (a) inductive heating means adapted to heat said gear teeth surfaces to a quench hardening temperature to a selected shallow depth below said gear teeth surfaces; and,
   (b) quench means comprising:
      (i) a circular conduit having a central axis adapted to receive quenching fluid
      (ii) fluid delivery means adapted to deliver quenching fluid to said conduit
      (iii) a plurality of apertures in said conduit adapted to eject jets of quenching fluid directed to said gear wherein each said jet has a vertical offset angle of about 28° to 37° from horizontal and a horizontal offset angle approximately equal to said vertical offset angle divided by about 90° and multiplied by said helix angle.

2. The apparatus of claim 1 wherein said conduit comprises a first side wall, said first side wall being inclined with respect to vertical and forming a truncated cone, said conduit apertures being disposed in said first side wall.

3. The apparatus of claim 2 wherein said apertures are arrayed in said first side wall in a plurality of subarrays, each subarray comprising a plurality of apertures distributed around said circular conduit, each said aperture having an axis vertically offset from a radial direction by a selected subarray vertical offset angle.

4. The apparatus of claim 3 wherein said subarray vertical offset angles are about 30° from horizontal.

5. The apparatus of claim 4 wherein each said subarray has a unique subarray vertical offset angle said subarray vertical offset angle for the uppermost subarray being the smallest offset from horizontal, said subarray vertical angle for the lowermost subarray being the largest offset from horizontal and said subarray vertical offset angle for each intermediate subarray being larger than the subarray vertical offset angle for the subarray adjacently above it.

6. The apparatus of claim 4 wherein individual apertures in each subarray are vertically aligned with individual apertures from at least one other subarray whereby a plurality of jets from apertures having different subarray vertical offset angles are vertically aligned with a jet having a vertical offset angle closest to horizontal on top and a jet having a vertical offset angle furthest from horizontal on the bottom.

7. The apparatus of claim 6 further comprising means moving said elongated gear vertically with respect to said quench means and said inductive heating means.

8. The apparatus of claim 7 further comprising means rotating said gear as it moves vertically.

9. A method of hardening selected surfaces of an axially elongated gear having gear teeth surfaces, a central axis and a helix angle, said selected surfaces being said gear teeth surfaces, said gear teeth surfaces comprising the surfaces of radially projecting gear teeth and roots between adjacent teeth, said method comprising the following steps:
   heating said gear teeth surfaces to a quench hardening temperature to a selected shallow depth below said gear teeth surfaces;
   quenching said gear teeth surfaces by directing a quenching fluid toward said gear teeth surfaces in a circular array of jets wherein each of said jets has a vertical offset angle of about 28° to 37° from horizontal and a horizontal offset angle about equal to the vertical offset angle for said jet divided by about 90 and multiplied by said helix angle.

10. The method of claim 9 wherein said array of jets comprises a plurality of vertically adjacent circular subarrays of jets including an uppermost subarray and a lowermost subarray, each said subarray comprising a plurality of jets arranged in a circular pattern, all said jets in a selected subarray having a fixed subarray vertical offset angle and a fixed subarray first offset angle.

11. The method of claim 10 wherein each said subarray has a unique subarray vertical offset angle, said subarray vertical offset angle for said uppermost subarray being the smallest offset from horizontal, said subarray vertical offset angle for said lowermost array being the largest offset from horizontal and said subarray vertical offset angle for each intermediate subarray being larger than the subarray vertical offset angle for the subarray adjacently above it.

12. The method of claim 11 wherein individual jets in each subarray are vertically aligned with individual jets in at least one other subarray whereby a plurality of jets having different subarray vertical offset angles are vertically aligned with a jet having a subarray vertical offset angle closest to horizontal uppermost and a jet having a subarray vertical offset angle furthest from horizontal lowermost.

13. The method of claim 12 wherein said heating step is performed in a heating station directly above a quenching station where said quenching step is performed and said gear is continuously lowered through said stations during said steps whereby said heating and quenching steps are sequentially applied to moving annular zones of said gears.

14. The method of claim 13 wherein said gear is spun as it is lowered through said stations.

* * * * *